: 2,932,025
Patented Apr. 5, 1960

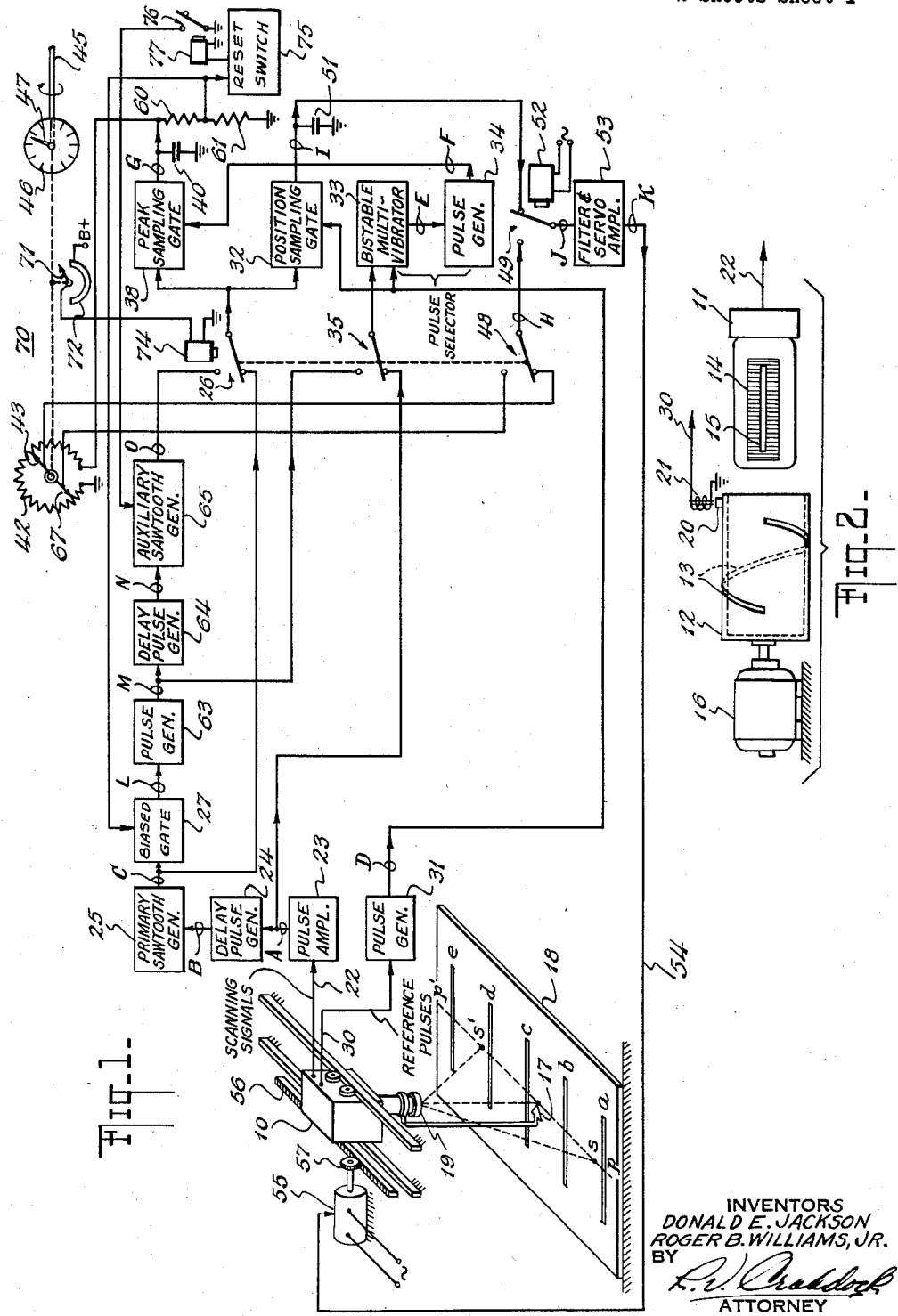

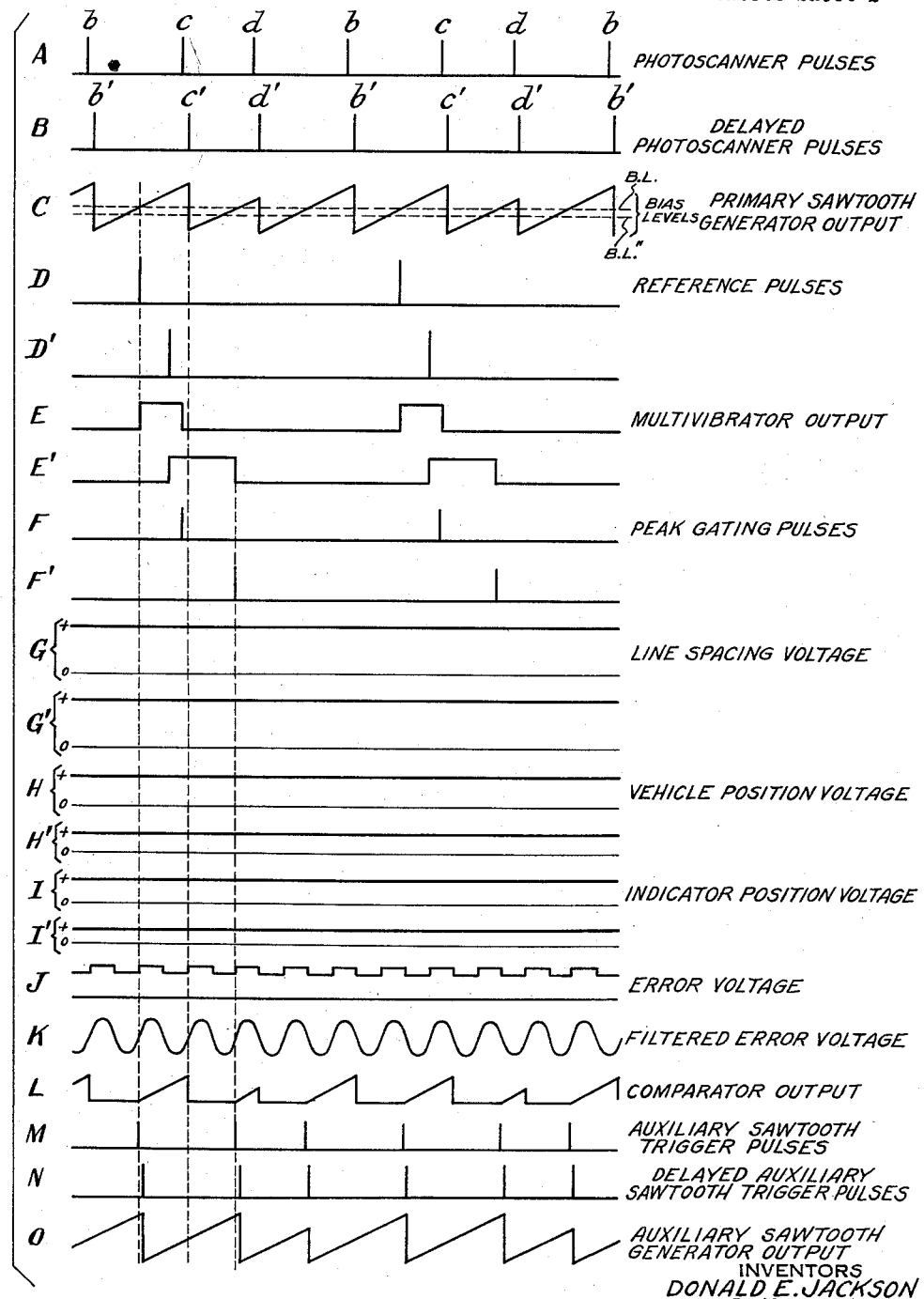

2,932,025

COURSE PLOTTER

Donald E. Jackson, Valley Stream, N.Y., and Roger B. Williams, Jr., Toledo, Ohio, assignors to Sperry Rand Corporation, a corporation of Delaware Application June 27, 1956, Serial No. 594,264

4 Claims. (Cl. 343—112)

This invention relates to automatic plotting systems, and more particularly to a system for continuously indicating the position of a moving vehicle on a chart representing an area by comparing signals derived from photoelectrically scannning the chart with signals corresponding to the position of the vehicle with respect to the area.

Maps and charts of geographical areas are employed for use in navigating vehicles such as boats and aircraft. Such charts usually have a reference grid superposed on the geographical pattern. This grid may correspond to latitude and longitude coordinates, or to some other navigational coordinate system, such as the hyperbolic lines of position used in loran. In plotting the position of a moving vehicle on such a chart, it is necessary to obtain continuous information of the position of the vehicle relative to the coordinate system employed, and using this information to interpolate between the lines comprising the grid in order to depict the position of the vehicle on the chart.

Thus, in loran, the lines of position are hyperbolas and correspond to measured time differences between the arrival of pulses from radio transmitting stations. The intersection of a pair of lines of position corresponding to two measured time differences determines the position of the vehicle. For example, three adjacent grid lines may represent time differences of 1400, 1600, and 1800 microseconds respectively. When the position of the vehicle does not correspond to a coordinate line, it is necessary for the plotting system to interpolate between the grid lines corresponding to the nearest lines of position. Thus, if the loran time difference at the location of the vehicle were 1450 microseconds, the position of the vehicle on the chart would have to be represented at one-quarter of the distance between the grid lines corresponding to 1400 and 1600 microseconds.

In a patent application Serial No. 577,401, filed April 10, 1956, in the name of Wilbert P. Frantz, and assigned to the same assignee as the instant invention, now U.S. Patent No. 2,892,948, there is disclosed a system for automatically interpolating between two grid lines in order to represent the position of a vehicle between two coordinate lines. This is accomplished by comparing photoscanner output signals, derived from photoelectrically scanning the chart, with an input signal corresponding to the instantaneous position of the vehicle with respect to the coordinate system. A path transverse to the grid lines is scanned and a first voltage produced representing the chart distance between the two grid lines corresponding to the two coordinate lines adjacent the vehicle. This first voltage is supplied to a voltage divider which delivers a proportionate second voltage determined by the input signal. A third voltage is produced representing the distance between one of said two grid lines and a reference point fixed with respect to the photoscanner. A voltage comparator responsive to the difference between the second and third voltages energizes a servomotor to vary the position of the photoscanner until the reference point represents the position of the vehicle on the chart.

The vehicle may travel sufficiently far, however, that the locus of its course on the chart crosses a grid line. In such instance the interpolation circuit will not function to drive the reference point across the grid line. Accordingly, means must be added to the previously described system to enable the automatic plotting of the course of a vehicle when the locus of said course crosses a grid line. Such a system is described in a patent application Serial No. 588,209, filed May 28, 1956, in the name of Robert L. Frank, assigned to the same assignee as the instant invention. The invention described herein is an improvement over the system described in the aforementioned patent application, being particularly effective for automatic course plotting in areas where the coordinate lines are nonuniformly spaced.

It is the principal object of this invention to provide improved apparatus for automatically plotting the locus of the course of a vehicle on a gridded chart representing an area when the locus crosses a grid line, in correspondence with the course of the vehicle in said area when said course crosses a coordinate line.

It is a further object of this invention to automatically and continuously plot the position of a vehicle on a chart employing a superposed reference grid.

It is a further object of this invention to automatically position an object with respect to a grid on a chart representing an area in accordance with input navigational signals representing the position of a vehicle with respect to said area.

Another object of this invention is to automatically move a photoscanner, while scanning lines of a chart grid, to a position with respect to said grid in accordance with input navigational data.

Another object of this invention is to automatically move a reference point across grid lines on a chart in accordance with input navigational data.

In accordance with the present invention, the reference point fixed with respect to the photoscanner is proportionately positioned between the pair of grid lines defining the area in which the vehicle is located. However, when the vehicle moves to a point whose distance from a coordinate line is less than a predetermined value, the system no longer interpolates between grid lines, but, instead, interpolates between points spaced midway between the grid lines. In this manner the vehicle's course may be smoothly plotted among a locus crossing a grid line.

The present invention will now be described with reference to the following drawings, wherein:

Fig. 1 is a block diagram of the scanning and positional control system of the present invention;

Fig. 2 is an exploded view of the photoscanner showing the phototube with an apertured mask covering the photosensitive cathode; and Fig. 3 illustrates waveforms of voltages associated with the block diagram of Fig. 1.

Interpolation between grid lines

In Fig. 1, a photoelectric scanning device 10, hereinafter termed a photoscanner, is disposed above an illuminated chart 18 of the area in which the vehicle is to navigate. Superposed on chart 18 is a grid system corresponding to the navigational coordinate system employed in said area, which includes the lines $a$, $b$, $c$, $d$, and $e$. Generally, a navigational coordinate system comprises two intersecting sets of lines, the lines of each set being nonintersecting. Only one line set is shown on chart 18. The photoscanner scans the chart along a locus $p$—$p'$ transversely to the grid lines. An indicator 17, or other reference point fixed with respect to the photoscanner 10, is representative of the photoscanner's position with respect to the chart. When the apparatus is in operation the position of the indicator with respect to the chart will correspond to the position of the vehicle with respect to the area represented by the chart. Although indicator 17 is shown affixed to photoscanner 10, it may be oriented for recording on a second adjacent chart, which represents the same area as chart 18, thereby avoiding possible interference with the photoelectric scanning operation.

The photoscanner includes a phototube 11 whose photocathode is covered with a mask 14 having a narrow aperture 15 extending parallel to the longitudinal axis of the phototube, as shown in Fig. 2. The phototube 11 with mask 14 is situated within a hollow cylindrical drum 12 which has a one turn helical slit 13 in the wall thereof. Light is admitted to the cathode only through the small opening defined by the intersection of the narrow helical slit 13 and a narrow aperture 15 in mask 14. The cylindrical drum is rotated at constant angular velocity by motor 16 to provide scanning along a straight line segment $s$—$s'$ of locus $p$—$p'$ extending parallel to the longitudinal axis of the cylindrical drum. The image of the chart along the segment $s$—$s'$ is focused at the plane of aperture 15, by a lens 19. As the point of intersection of slit 13 and aperture 15 moves due to the rotation of drum 12, different elements of the scanned line segment are exposed to the phototube. The photoscanner is similar to the scanner shown in application Serial No. 473,249 filed December 6, 1954, in the name of Roger B. Williams, Jr., and assigned to the same assignee as the present invention.

A magnetic tab 20 is attached to the outside wall of cylindrical drum 12 at a position thereon corresponding to a point on the scanned segment $s$—$s'$, such as the center of the scanned segment, and thus to the position of indicator 17 with respect to the scanned segment. As the cylindrical drum rotates at a constant angular velocity, the magnetic tab 20 revolves past a pick-up coil 21 and induces a reference pulse voltage across the terminals thereof at the instant the photoscanner is scanning the center point of the segment $s$—$s'$. In this example the indicator lies between grid lines $b$ and $c$.

As photoscanner 10 scans line segment $s$—$s'$, which crosses a number of grid lines, shown by way of example in Fig. 1 to be lines $b$, $c$, and $d$, the phototube 11 delivers recurrent groups of pulses on a lead 22 corresponding to the grid lines being scanned. These pulses are amplified and shaped in a pulse amplifier 23 to produce recurrent groups of pulses of waveform A (illustrated in Fig. 3) in a manner similar to that shown and described in the aforesaid pending Frantz application Serial No. 577,401. The time between the pulses of each group of waveform A varies according to the distance between the lines $b$, $c$, and $d$ as measured along the locus $p$—$p'$. Thus, in waveform A, the recurrent pulses are identified by the lines to which they correspond. Photoscanner 10 is arranged to scan at least a total distance equal to twice the greatest spacing between two adjacent grid lines.

The recurrent pulses of waveform A are coupled to the lower fixed contact of a relay 35 and to a delay pulse generator 24, the latter producing the delayed output pulses of waveform B. These pulses are delayed only slightly from the pulses of waveform A. A primary sawtooth generator 25 is coupled to delay pulse generator 24 and is responsive to the pulses of waveform B, producing a primary linear sawtooth voltage wave of waveform C. The peak values of this primary linear sawtooth voltage wave vary according to the time intervals between successive input pulses, thereby representing the distances between adjacent grid lines. Thus, the peak value of the primary linear sawtooth voltage cycle generated between the pulses designated as $b'$ and $c'$ is proportional to the distance between the grid lines $b$ and $c$ as measured along locus $p$—$p'$. The peak value of the sawtooth voltage cycle generated between the pulses $c'$ and $d'$ is considerably less than that generated between pulses $b'$ and $c'$ because of the smaller spacing between grid lines $c$ and $d$. The primary sawtooth voltage wave of waveform C is coupled to the lower fixed contact of relay 26 and to a biased gate 27.

The reference pulses induced in pick-up coil 21 are coupled through a lead 30 to a pulse generator 31, which shapes the input reference pulses to produce narrow reference pulses of waveform D. The reference pulses of waveform D are coupled to a position sampling gate 32, where they act as gating pulses, and to one terminal of a bistable multivibrator 33.

The movable contact of relay 35 is connected to another input terminal of multivibrator 33. The reference pulses of waveform D activate or turn on multivibrator 33. With the movable contact of relay 35 in its lower position, the first pulse of waveform A following each activation of multivibrator 35 will deactivate or turn off the multivibrator. Thus, multivibrator 35 is triggered by a pair of input signals to produce recurrent rectangular pulses, as in waveform E, the leading edges of the pulses coinciding with the reference pulses of waveform D and the trailing edges of the pulses coinciding with the first pulses of waveform A to follow the reference pulses. A pulse generator 34 is adapted to receive the multivibrator output rectangular pulses of waveform E and in response thereto to produce recurrent pulses (waveform F) coincident with the trailing edges of the rectangular pulses. The combination of bistable multivibrator 33 and pulse generator 34 is termed a pulse selector because of its apparent ability to pass only one of each group of pulses of waveform A. The recurrent pulses of waveform F are applied as gating pulses to actuate a peak sampling gate 38.

With the movable contact of relay 26 in its lower position, peak sampling gate 38 is recurrently actuated by the gating pulses of waveform F to periodically sample the magnitude of the primary linear sawtooth voltage wave of sawtooth generator 25.

Peak sampling gate 38 charges a capacitor 40 to the instantaneous voltage of the primary sawtooth wave at the instant of occurrence of the gating pulses of waveform F. Because waveform C lags slightly the pulses of waveform A, capacitor 40 is charged to a voltage equal to the peak voltage of the primary sawtooth voltage cycle generated between the pulses $b'$ and $c'$ of waveform B. In other words, capacitor 40 produces a first direct voltage of waveform G whose magnitude is proportional to the distance between the lines $b$ and $c$. This first direct voltage is coupled to a linear potentiometer voltage divider 42, which may be of a continuously rotatable type. A second direct voltage of waveform H is produced at an arm 43 of voltage divider 42.

The magnitude of the second direct voltage of waveform H bears a ratio to the magnitude of the first direct voltage of waveform G as determined by the setting of a shaft 45. A dial 46 and a pointer 47 coupled to shaft 45 may be calibrated in terms of percent of angular rotation of shaft 45, such that when voltage divider 42 produces a second direct voltage whose magnitude is equal to the magnitude of the first direct voltage, the pointer 47 indicates 100%. When voltage divider 42 produces zero output voltage at arm 43, the pointer 47 indicates 0%. Thus, where the linear potentiometer 42 is of the continuously rotatable type, one turn of shaft 45 represents 100% of the magnitude of the first direct voltage of waveform G. Accordingly, one turn of shaft 45 may be considered as representing the distance between the two grid lines adjacent the indicator as measured along locus $p$—$p'$, and this relation is maintained regardless of the spacing between these lines. In the example shown one turn of shaft 45 corresponds to the distance between grid lines $b$ and $c$.

An input positional signal representing the ratio of the distance of the vehicle from an adjacent coordinate line, corresponding to the grid line *b*, to the distance between the coordinate lines adjacent the vehicle, corresponding to the grid lines *b* and *c*, serves to position shaft 45. The percent rotation of shaft 45 corresponds directly to this ratio. Thus, the ratio of the second direct voltage to the first direct voltage is equal to this ratio. Consequently, voltage divider 42 acts as a proportioning means, delivering at arm 43 a voltage representing the position of the vehicle between grid lines *b* and *c*.

The second direct voltage of waveform H produced at arm 43 is coupled to the lower fixed contact of a relay 48. With the movable contact of relay 48 in its lower position, the second direct voltage is coupled to the left fixed contact of a relay 49.

With the movable contact of relay 26 in its lower position the primary sawtooth voltage wave of primary sawtooth generator 25 is also coupled to the position sampling gate 32. Position sampling gate 32 is recurrently actuated by the reference pulses of waveform D to periodically sample the magnitude of the linear sawtooth voltage wave applied. Position sampling gate 32 charges a capacitor 51 to the instantaneous voltage of the sawtooth wave at the instant of occurrence of the reference pulses. Thus, in this illustration, capacitor 51 produces a direct voltage of waveform I whose magnitude is proportional to the distance between grid line *b* and the indicator. The direct voltage produced by capacitor 51 is coupled to the right fixed contact of relay 49.

An error control voltage whose magnitude varies according to the difference between the second direct voltage of waveform H and the direct voltage of waveform I is produced for controlling the position of indicator 17 along locus *p—p'*. This error control voltage is obtained from the movable contact of relay 49. This movable contact alternates between the fixed contacts at the frequency of an alternating switching voltage supplied to relay winding 52 and serves to compare the magnitudes of the two direct voltages applied to the fixed terminals. For the condition when the magnitude of the second direct voltage of waveform H exceeds the magnitude of the direct voltage of waveform I, the voltage at the movable contact of relay 49 appears as waveform J of Fig. 3. This voltage is coupled to a filter and servo amplifier 53 to produce the sinusoidal error control voltage of waveform K. The phase of this error control voltage is determined by the larger of the two direct voltages which were compared, and its amplitude is determined by the difference between the two voltages.

The error control voltage is coupled through lead 54 to servomotor 55. An alternating voltage from the same source as the alternating switching voltage applied to relay winding 52 is supplied as a reference voltage to servomotor 55. The error control voltage of waveform K energizes servomotor 55 to drive the photoscanner 10 along its direction of scan by means of a rack 56 and a pinion 57 until the error control voltage is reduced substantially to zero, whereupon the position of the indicator with respect to the grid lines corresponds to the position of the vehicle with respect to the navigational coordinates.

Thus the system may be arranged to interpolate between adjacent loran lines of position where the grid lines *b* and *c* on chart 18 represent the loran lines between which the vehicle is located. Where these loran lines are spaced apart by a distance corresponding to a certain fixed time difference interval, for example, 100 microseconds, the shaft 45 must be properly geared and indexed to the input positional signal representing the measured loran number or time difference so that one revolution of shaft 45 corresponds to a change in time difference of 100 microseconds. A direct reading loran receiver such as the Mark II Loran, manufactured by the Sperry Gyroscope Company, Division of Sperry Rand Corporation, indicates the measured time difference between the arrival of master and slave pulses as a number on a mechanically driven revolution counter. Accordingly, the mechanical shaft driving the revolution counter may be coupled through appropriate gearing so that a 100 microsecond change in the time difference as read on the revolution counter corresponds to one turn of shaft 45. For example, assume that the position of a vehicle to be navigated by means of the loran system is situated between two adjacent lines of position, one line corresponding to a time difference of 2600 microseconds, and the other line corresponding to a time difference of 2700 microseconds. Grid lines *b* and *c* on chart 18 would correspond to the loran lines representing respectively 2600 and 2700 microseconds. Any intermediate angular position of shaft 45 corresponding to the position of the vehicle between the two loran lines produces a second direct voltage to which the direct voltage of capacitor 51 would be compared. Thus, the position of the indicator with respect to chart 18 represents the position of the vehicle between the loran lines of position.

*Plotting across grid lines*

The system thus far described is capable of interpolating between adjacent grid lines but will not properly record the course of the vehicle when the locus of the course crosses a grid line. Thus, in the particular example which has been described, if the vehicle were to move across the coordinate line corresponding to the grid line *c* into the area bounded by the coordinate lines corresponding to grid lines *c* and *d*, the indicator would not be capable of following, but instead would receive an error signal which would cause it to jump back to a point in the vicinity of grid line *b*. However, by incorporating the principle of this invention into the system so far described the indicator can smoothly plot the course of the vehicle as it navigates across coordinate lines.

In this invention the photoscanner interpolates between adjacent points located substantially midway between the grid lines along the locus *p—p'* when the vehicle approaches close to any coordinate line. This auxiliary method of interpolation permits the indicator to cross a grid line without the operative portion of the system sensing its presence. Auxiliary interpolation is accomplished by generating and utilizing a pair of auxiliary voltages, one representing the position of the indicator relative to the midpoints between the grid lines and the other representing the position of the vehicle relative to the midpoints between the coordinate lines.

The first direct voltage produced by capacitor 40 is also coupled to a voltage divider, such as resistors 60 and 61, which in turn produces an output direct voltage whose magnitude is one-half that of the first direct voltage. This voltage divider output direct voltage is coupled to biased gate 27, which also receives the primary sawtooth voltage of waveform C. The voltage divider output direct voltage acts as a type of bias for gate 27, which yields no output signal until the primary sawtooth wave becomes greater than this bias. When the primary sawtooth wave becomes greater than the bias direct voltage (dotted lines of waveform C) an output signal is produced by gate 27, the instantaneous value of the signal being proportional to the amount by which the primary sawtooth wave exceeds the bias voltage. The bias level designated B.L. in waveform C is equal to one-half of the peak voltage of the primary sawtooth cycle corresponding to the spacing between the grid lines *b* and *c*. The output signal from gate 27 for the bias level B.L. is shown in waveform L. A pulse generator 63 is coupled to gate 27 and is responsive to the output voltage thereof, producing a pulse at the instant the primary sawtooth wave to gate 27 exceeds the bias level. The pulse train output signal of pulse generator 63 for an input signal of waveform L is shown in waveform M. The pulses of waveform M simulate a series of lines along locus *p—p'* having the spacing of the grid lines, but displaced therefrom by a distance equal to one-half that between grid lines *b* and *c*. The pulse train of waveform M is coupled to a delay pulse generator 64, to produce the delayed output pulse train of waveform N, and to the upper fixed contact of relay 35. The pulse train of waveform N is delayed only slightly from the pulse train of waveform M. An auxiliary sawtooth generator 65 is coupled to delay pulse generator 64 and is responsive to the pulses of waveform N, producing an auxiliary linear sawtooth voltage wave of waveform O. The auxiliary sawtooth wave of sawtooth generator 65 is coupled the upper fixed contact of relay 26. Thus, the movable contact of relay 26 selects either the primary sawtooth voltage wave at the lower fixed contact or the auxiliary sawtooth voltage wave at the upper fixed contact. In the example illustrated, the auxiliary sawtooth wave lags the primary sawtooth wave by one-half the time interval between the photoscanner pulses *b* and *c*.

The movable contact of relay 35 selects either the photoscanner pulses of waveform A, corresponding to the grid lines being scanned, at the lower fixed contact, or the pulse train of waveform M, corresponding to points located substantially midway between the grid lines, at the upper fixed contact.

A third direct voltage, shown as waveform H', is produced at an arm 67 of voltage divider 42. Arm 67 is fixed diametrically with respect to arm 43 and is insulated therefrom. Because total rotation of shaft 45 represents 100% of the magnitude of the first direct voltage of waveform G, the magnitude of the third direct voltage of arm 67 differs by 50% from that of the second direct voltage of arm 43. Since the ratio of the second direct voltage to the first direct voltage is equal to the ratio represented by the input positional signal, it follows that the ratio of the third direct voltage to the first direct voltage differs from the ratio represented by the input positional signal by the value one-half. Consequently the third direct voltage represents the position of the vehicle with respect to points spaced substantially midway between the grid lines. The third direct voltage is coupled to the upper fixed contact of relay 48. Thus, the movable contact of relay 48 selects either the second direct voltage, corresponding to the position of the vehicle relative to the grid lines, at the lower fixed contact, or the third direct voltage, corresponding to the position of the vehicle relative to points spaced substantially midway between the grid lines, at the upper fixed contact.

The positions of the movable contacts of relays 26, 35, and 48 are determined by the setting of shaft 45. A rotary switch 70 comprises a movable contact 71 and a fixed arcuate contact 72. Movable contact 71 is connected to shaft 45 so that the position of movable arm 71 corresponds to the positions of pointer 47 and arm 43. Fixed contact 72 subtends an arc of 180°, and is connected to a voltage source. Contact is made between movable contact 71 and fixed contact 72 only when arm 43 is less than 90° from either extremity of voltage divider 42. When contact is made between contacts 71 and 72, a voltage is delivered to relay winding 74 causing the movable contacts of relays 26, 35, and 48 to contact the upper fixed contacts of their respective relays. As the degree of rotation of shaft 45 represents the position of the vehicle with respect to the adjacent coordinate lines, relay winding 74 is energized whenever the vehicle is closer to the nearest coordinate line than one-quarter the distance between the two coordinate lines adjacent to the vehicle. When the vehicle is farther from the nearest coordinate line than one-quarter of said distance, relay winding 74 is not energized, and the movable contacts of relays 26, 35, and 48 contact the lower fixed contacts of their respective relays.

In operation, assume that the vehicle is moving between the coordinate lines corresponding to grid lines *b* and *c*, but is not close to either coordinate line. Relay winding 74 will not be energized and the primary sawtooth wave will be coupled to position sampling gate 32 and peak sampling gate 38, the photo-scanner pulses of waveform A will be coupled to the pulse selector, and the second direct voltage of voltage divider arm 43 will be coupled to the left fixed contact of relay 49. The pulse selector will select the next pulses of waveform A immediately following the reference pulses of waveform D, and apply the selected pulses to peak sampling gate 38. Peak sampling gate 38 in cooperation with capacitor 40 will then deliver a first direct voltage of waveform G, corresponding to the peak voltage of the primary sawtooth cycle generated between the pulses *b'* and *c'* of waveform B. This first direct voltage will be coupled to voltage divider 42 which in turn will deliver a second direct voltage through relay 48 to relay 49 corresponding to the distance of the vehicle from grid line *b*. Position sampling gate 32 in cooperation with capacitor 51 will deliver a direct voltage of waveform I, corresponding to the distance of the indicator from grid line *b*, to the right fixed contact of relay 49. The error control voltage K thus represents the distance between the position of the indicator and the position of the vehicle as measured along locus *p—p'*.

During the above described circuit operation auxiliary sawtooth generator 65 continues to generate an auxiliary sawtooth wave of waveform O lagging the primary sawtooth wave of waveform C by substantially one-half the time interval between pulses *b'* and *c'*. As the vehicle continues to move and approaches a coordinate line corresponding to grid line *c*, connection is made between contacts 71 and 72, and relay winding 74 becomes energized. The auxiliary sawtooth wave is now coupled to position sampling gate 32 and peak sampling gate 38, the pulses of waveform M are now coupled to the pulse selector, and the third direct voltage of voltage divider arm 67 is now coupled to the left fixed contact of relay 49. The pulse selector will now select the next pulses of waveform M immediately following the reference pulses of waveform D'. Waveform D' is a waveform of the reference pulses generated as the vehicle approaches the coordinate line corresponding to grid line *c* and the indicator correspondingly approaches grid line *c*. The output of the pulse selector under these conditions is shown as waveform F'. Peak sampling gate 38 now charges capacitor 40 to the instantaneous value of the auxiliary sawtooth cycle at the instant of occurrence of the gating pulses of waveform F'. Because waveform O lags slightly the pulses of waveform M, capacitor 40 is charged to a voltage equal to the peak voltage of the auxiliary sawtooth cycle generated during a time interval equal to that between the pulses *b* and *c* of waveform A. Thus capacitor 40 continues to produce a first direct voltage, shown as waveform G', whose magnitude is proportional to the distance between the lines *b* and *c*.

The first direct voltage of waveform G' is coupled to voltage divider 42, the total voltage across the divider representing the distance between grid lines *b* and *c*. As the second direct voltage from voltage divider arm 43 represents the distance of the vehicle from grid line *b*, the third direct voltage from voltage divider arm 67 will represent the distance of the vehicle from a point located midway between grid lines *b* and *c*. Thus, the third direct voltage of waveform H' will be coupled through relay 48 to relay 49. Position sampling gate 32 is now recurrently actuated by the reference pulses of waveform D' to periodically sample the magnitude of the auxiliary sawtooth wave. Capacitor 51 will produce a direct output voltage of waveform I' whose magnitude represents the distance between the indicator and a point midway between grid lines *b* and *c*. The voltage of waveform I' is coupled to the right fixed contact of relay 49. Relay 49 now compares two direct voltages representing respectively the distance of the vehicle's position from a point located midway between the grid lines *b* and *c* and the distance of the indicator position from said midway point. An appropriate error signal will be generated of a sense to make the two direct voltages equal. Thus, by employing the third direct voltage in lieu of the second direct voltage, and the auxiliary sawtooth wave in lieu of the primary sawtooth wave, the apparatus is able to plot the course of the vehicle when the locus of the course crosses a grid line.

For adidtional convenience in understanding the operation of this invention, bias level B.L." is indicated on waveform C. B.L." represents a voltage equal to the half of the peak voltage of the sawtooth cycle corresponding to the spacing between grid lines c and d. This bias level, which determines the amount by which the auxiliary sawtooth wave lags the primary sawtooth wave, is developed only after the indicator has moved to a position between grid lines c and d that is farther from grid line c than one-quarter the distance between the two grid lines. At this time relay winding 74 is deenergized and the system reverts to interpolation between the grid lines, in this instance, grid lines c and d.

Under certain conditions of operation the bias level applied to biased gate 27 might become so high as to exceed the maximum value of the primary sawtooth wave applied to biased gate 27. This could occur, for example, if the system is operating in the auxiliary mode; that is, with the movable contacts of relays 26, 35, and 48 in their upper positions, and the scanning signal is momentarily interrupted. The primary sawtooth voltage would rise to a maximum, no pulses would be produced by pulse generator 63, and the auxiliary sawtooth voltage would in turn rise to a maximum. Capacitor 40 would then become charged to this maximum value of the auxiliary sawtooth voltage. When, once again, the scanning signal is restored, the primary sawtooth voltage wave would never rise to a voltage greater than the bias level. To prevent such an occurrence a reset switch 75 and a relay 76 have been added to the system thus far described. The bias voltage output of the voltage dividing resistors 60, 61 is applied to reset switch 75. When the bias voltage rises to a predetermined value, which should be somewhat greater than one-half the maximum expected value of the primary sawtooth voltage, reset switch 75 delivers an output voltage. The output voltage of reset switch 75 is applied to the winding 77 of relay 76. This in turn causes the movable contact of relay 76 to move to the upper fixed contact, and discharge the auxiliary sawtooth generator 65, terminating the auxiliary sawtooth wave.

Although this invention has been described as employing direct voltages to represent various ratios and linear distances, it is within the scope of this invention to employ signals of other types, such as electrical signals of different alternating voltages, electrical signals of different frequencies, digital code signals, mechanical signals of shaft rotation, and mechanical signals of displacement.

While the invention has been described in its preferred embodiment, it is to be understood that the words which have been used are words of description rather than of limitation and that changes within the purview of the appended claims may be made without departing from the true scope and spirit of the invention in its broader aspects.

What is claimed is:

1. Apparatus for comparing the location of a first point with respect to a chart representing an area with the position of a second point with respect to said area, the position of said second point with respect to said area being described by its location relative to an arbitrary coordinate system fixed with respect to said area, said coordinate system comprising at least first, second and third spaced lines, said chart having superimposed thereon first, second and third spaced grid lines corresponding to said coordinate lines, said apparatus receiving an input first signal representing a ratio equal to the distance of said second point from an adjacent coordinate line divided by the distance between two adjacent coordinate lines between which said second point lies, and wherein a second signal is generated representing the position of said first point with respect to two adjacent grid lines between which said first point lies, comprising in combination, means for generating a third signal representing the position of said first point from a third point located between the first and second of said grid lines divided by the distance between said first and second grid lines, means for generating a fourth signal representing the distance of said second point from a fourth point located between said first and second coordinate lines divided by the distance between the first and second of said coordinate lines irrespective of which side of said second coordinate line said second point is located, and comparator means for producing an error signal corresponding to the difference between a pair of received signals, said comparator means being connected to receive said first and second signals when said ratio has a value equal to one of a predetermined range of values, said comparator means being adapted to receive said third and fourth signals when said ratio has a value other than one within said predetermined range of values.

2. Apparatus as in claim 1 wherein said third point is disposed midway between said first and second grid lines.

3. Apparatus as in claim 1 wherein said third point is located midway between said first and second grid lines and wherein said predetermined range of values includes the range of numbers between one-quarter and three-quarters.

4. Apparatus for automatically locating an indicator with respect to a chart representing an area to correspond with the position of a vehicle with respect to said area, the position of said vehicle with respect to said area being described by its location relative to an abitrary coordinate system fixed with respect to said area, said coordinate system comprising at least one set of nonintersecting lines, said chart being illuminated and having superposed thereon a plurality of nonintersecting grid lines corresponding to said coordinate lines, said apparatus receiving an input signal representing a first ratio equal to the distance of said vehicle from an adjacent coordinate line divided by the distance between the two coordinate lines adjacent said vehicle, comprising in combination, a photoscanner fixed with respect to said indicator and having photosensitive means for producing an output electrical signal in accordance with the amount of light received and a directive means for directing light received from an elemental area of said chart upon said photosensitive means, means for recurrently varying the orientation of said directive means whereby said photosensitive means receives light recurrently and successively from a series of contiguous elemental areas defining a locus transverse to said grid lines, whereby the output signal from said photosensitive means consists of recurrent groups of first pulses corresponding to said grid lines, said groups being recurrent at the frequency of variation of the orientation of said directive means, and the time between pulses of a group corresponding to the spacing of said grid lines along said locus, a reference pulse generator coupled to said photoscanner for generating reference pulses recurrent at the frequency of variation of the orientation of said directive means, said reference pulses having a temporal relationship to the pulses of said groups corresponding to the location of said indicator with respect to said grid lines, delay means coupled to said photoscanner and responsive to said first pulses for producing an output signal comprising recurrent groups of second pulses corresponding to said grid lines, said second pulses lagging said first pulses by a time small compared to the time between any two successive first pulses, a first sawtooth generator coupled to said delay means and responsive to said second pulses for generating a first linear sawtooth voltage wave, a pulse selector means coupled to receive pulses from said reference pulse generator and responsive to said reference pulses for producing gating pulses simultaneously with the first pulses of a second received pulse train immediately following said reference pulses, first gating means for producing a first direct voltage equal to the instantaneous magnitude of a voltage wave received at a first input terminal when said first gating means is triggered by a pulse applied to a second input terminal, said first gating means second input terminal being coupled to said pulse selector means, first proportioning means responsive to said input signal and coupled to said first gating means for receiving said first direct voltage and for delivering a second direct voltage bearing a ratio to said first direct voltage equal to said first ratio, second proportioning means responsive to said input signal and coupled to said first gating means for receiving said first direct voltage and for delivering a third direct voltage bearing a ratio to said first direct voltage differing from said first ratio by the number one-half, voltage dividing means coupled to said first gating means and responsive to said first direct voltage for producing a direct voltage having a magnitude equal to one-half that of said first direct voltage, means adapted to receive said first sawtooth wave and responsive to the output of said voltage dividing means for producing auxiliary trigger pulses at the instant the magnitude of the first sawtooth wave increases from less than to greater than said voltage dividing means output direct voltage, second delay means coupled to said auxiliary trigger means for producing delayed auxiliary trigger pulses, said delayed auxiliary trigger pulses lagging said auxiliary trigger pulses by a time small compared to the time between any two successive auxiliary trigger pulses, a second sawtooth generator coupled to receive said delayed auxiliary trigger pulses and responsive thereto for generating a second linear sawtooth voltage wave, second gating means for producing a fourth direct voltage equal to the instantaneous magnitude of a voltage wave received at a first input terminal when said second gating means is triggered by a pulse applied to a second input terminal, said second gating means second input terminal being coupled to said reference pulse generator, comparator means for producing an error control voltage corresponding to the difference between a pair of input direct voltages, said comparator means being coupled to said second gating means for receiving said fourth direct voltage; means for coupling said first sawtooth voltage wave to the first input terminals of said first and second gating means, for coupling said photoscanner first pulses to said pulse selector means, and for coupling said second direct voltage to said comparator means when said first ratio has a value corresponding to one of a predetermined range of values; means for coupling said second sawtooth voltage wave to the first input terminals of said first and second gating means, for coupling said auxiliary trigger pulses to said pulse selector means, and for coupling said third direct voltage to said comparator means when said first ratio has a value other than one of said predetermined range of values.

No references cited.